United States Patent
Rella et al.

(10) Patent No.: US 11,986,965 B2
(45) Date of Patent: May 21, 2024

(54) METHOD AND SYSTEM FOR CONTINUOUSLY STORING AND LATER FOR VISUALLY REPRESENTING INTERNAL OPERATING STATES OF A ROBOT

(71) Applicant: Wittmann Kunststoffgeräte GmbH, Vienna (AT)

(72) Inventors: Johann Rella, Payerbach (AT); Peter Michael Wittmann, Leobendorf (AT)

(73) Assignee: Wittmann Kunststoffgeräte GmbH, Vienna (AT)

( * ) Notice: Subject to any disclaimer, the term of this patent is extended or adjusted under 35 U.S.C. 154(b) by 799 days.

(21) Appl. No.: 17/057,311

(22) PCT Filed: Jun. 24, 2019

(86) PCT No.: PCT/AT2019/060208
§ 371 (c)(1),
(2) Date: Nov. 20, 2020

(87) PCT Pub. No.: WO2020/000007
PCT Pub. Date: Jan. 2, 2020

(65) Prior Publication Data
US 2021/0316460 A1    Oct. 14, 2021

(30) Foreign Application Priority Data
Jun. 29, 2018 (AT) ............... A50537/2018

(51) Int. Cl.
*B25J 9/16* (2006.01)
*B25J 13/02* (2006.01)
(Continued)

(52) U.S. Cl.
CPC ............ *B25J 9/1674* (2013.01); *B25J 9/161* (2013.01); *B25J 9/1671* (2013.01); *B25J 9/1679* (2013.01);
(Continued)

(58) Field of Classification Search
CPC ........ B25J 9/1674; B25J 9/161; B25J 9/1671; B25J 9/1679; B25J 13/02; B29C 45/42; B29C 45/7626; B29C 2945/76795
See application file for complete search history.

(56) References Cited

U.S. PATENT DOCUMENTS 9,993,924 B2 * 6/2018 Linnell ................. B25J 9/1671
2003/0074170 A1    4/2003 Watanabe et al.
(Continued)

FOREIGN PATENT DOCUMENTS

DE    10 2009 023648    12/2010
DE    10 2016 000105    7/2016
(Continued)

OTHER PUBLICATIONS

Osrf, "Gazebo : Tutorial : Visualization and logging", Gazebo, Retrieved from the Internet: http://gazebosim.org/tutorials?tut=drcsim_visualization&cat=drcsim, [retrieved on Nov. 13, 2019], XP055642231, Jan. 1, 2014, pp. 1-7.
(Continued)

*Primary Examiner* — Gary Collins
(74) *Attorney, Agent, or Firm* — GREENBLUM & BERNSTEIN, P.L.C.

(57) ABSTRACT

A method for the continuous storage of internal operating states and visualization of past sequences of operations, as well as to a robot and/or robot controller, wherein the robot is preferably mounted on or next to a processing machine, in particular an injection molding machine and serves for the removal, handling, manipulation or further processing of injection molded parts which have just been produced. The robot controller records data, in particular changes of state, positions, internal parameters, time stamps, etc., and in case of occurrence of an error this most recently recorded information is linked to the error and stored, whereby the changes of state until the occurrence of the respective error are
(Continued)

Figure 1:
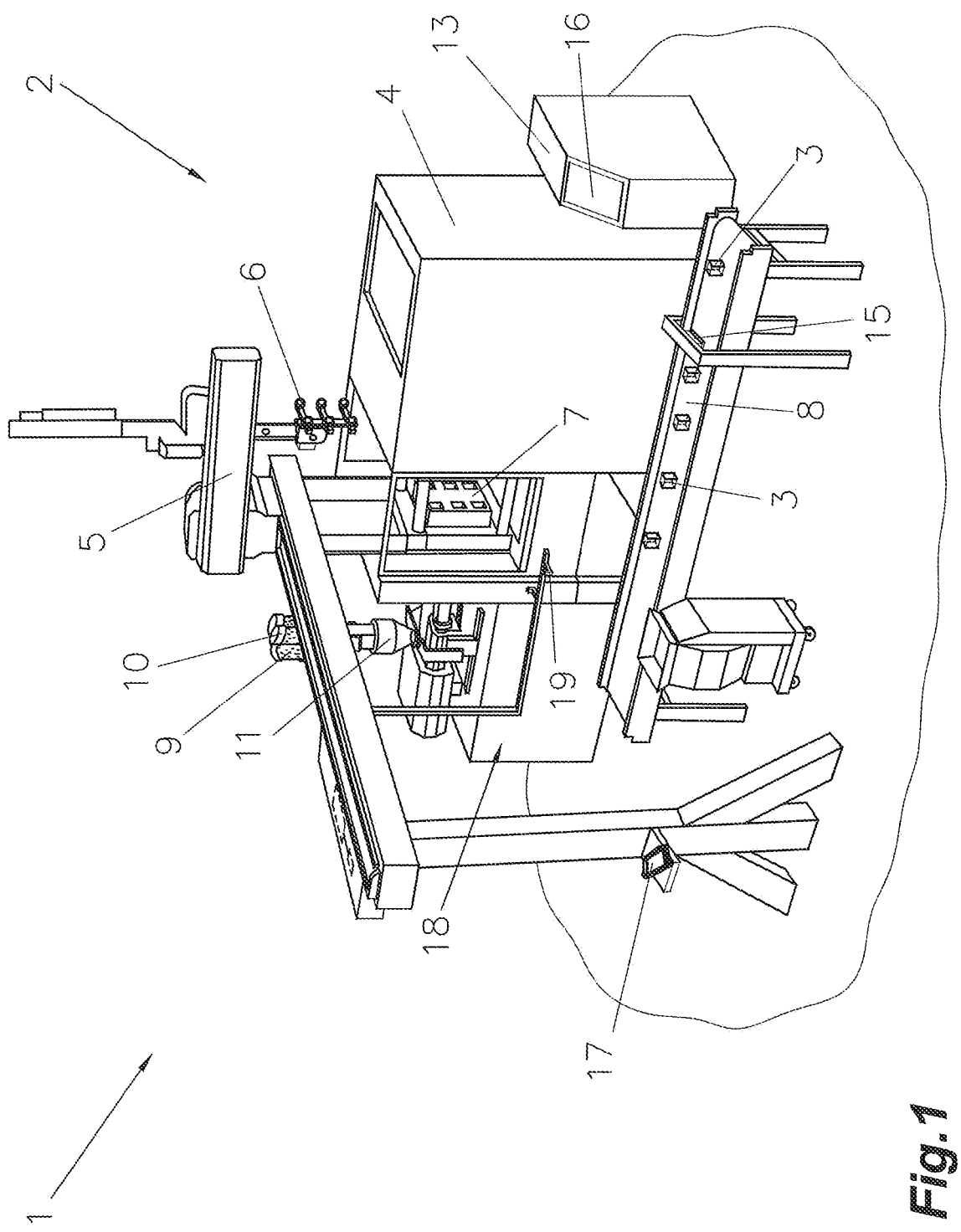

simulated and visually displayed for an analysis on the basis of a virtual model of the physical robot.

12 Claims, 4 Drawing Sheets

(51) Int. Cl.
*B29C 45/42* (2006.01)
*B29C 45/76* (2006.01)
(52) U.S. Cl.
CPC .............. *B25J 13/02* (2013.01); *B29C 45/42* (2013.01); *B29C 45/7626* (2013.01); *B29C 2945/76795* (2013.01)

(56) References Cited

U.S. PATENT DOCUMENTS

| | | | | |
|---|---|---|---|---|
| 2005/0071048 | A1* | 3/2005 | Watanabe ......... | G05B 19/4069 700/259 |
| 2007/0088526 | A1* | 4/2007 | Friedrich ............... | G06F 3/012 702/150 |
| 2007/0282485 | A1* | 12/2007 | Nagatsuka ......... | G05B 19/4069 700/245 |
| 2012/0265330 | A1 | 10/2012 | Beck et al. | |
| 2013/0277885 | A1* | 10/2013 | Nagami ............... | B29C 45/762 425/162 |
| 2016/0199981 | A1 | 7/2016 | Atohira et al. | |

FOREIGN PATENT DOCUMENTS

| | | |
|---|---|---|
| EP | 1 304 194 | 4/2003 |
| EP | 1 518 648 | 3/2005 |

OTHER PUBLICATIONS

Rister et al., "Integrated Debugging of Large Modular Robot Ensembles", 2007 IEEE International Conference on Robotics and Automation—Roma, Italy, IEEE, Piscataway, NJ, USA, ISBN: 978-1-4244-0601-2. XP031389122 , Apr. 10-14, 2007, pp. 2227-2234.

Kai Liang et al., "Fault localization in embedded control system software", Software Engineering for Smart Cyber-Physical Systems, IEEE Press, 445 Hoes Lane, PO Box 1331, Piscataway , NJ 08855-1331 USA, DOI: 10.1109/SESCPS.2015.10, XP058072686 , May 16, 2015, pp. 8-14.

Jo et al., "Virtual testing of agile manufacturing software using 3D graphical simulation," IEEE International Conference on Robotics and Automation, Apr. 25, 1997, pp. 1223-1228 (Abstract).

Int'l Search Report (Form PCT/ISA/210) conducted in Int'l Application No. PCT/AT2019/060208, (dated Nov. 21, 2019).

Int'l Written Opinion (Form PCT/ISA/237) conducted in Int'l Application No. PCT/AT2019/060208, (dated Nov. 21, 2019).

Int'l Prelim. Exam. Report (Form PCT/ISA/409) conducted in Int'l Application No. PCT/AT2019/060208, (dated Oct. 8, 2020)(w/ English translation).

* cited by examiner

METHOD AND SYSTEM FOR CONTINUOUSLY STORING AND LATER FOR VISUALLY REPRESENTING INTERNAL OPERATING STATES OF A ROBOT

The invention relates to a method for the continuous storage of internal operating states and visualization of past sequences of operations, as well as a robot and/or robot controller therefor, as described in the preambles of claims 1 and 8.

Systems are known from the state of the art where all data are recorded over the entire period in a working system by activating the appropriate function. Afterwards, the data are transferred to a laptop or computer by connecting the working system to it and stored on the same, after which the data can be analyzed externally on the laptop or computer.

The disadvantage of this approach is that an error analysis cannot be carried out immediately and the system remains out of operation for an extended period of time until the cause of the error has been found and corrected. Also, a large amount of data are stored during a longer working cycle, resulting in analysis necessitating a considerable effort.

The objective of the present invention is therefore to create a method for a robot and/or robot controller of the type mentioned above, whereby on the one hand the disadvantages described above are avoided and on the other hand user-friendliness is significantly increased. Here it is necessary to draw complex conclusions from the stored data on the movement sequence of the system, which often makes it difficult to find the cause of the error.

The objective is achieved by the invention.

The device according to the present invention is characterized in that the robot controller records data, in particular changes of state, positions, internal parameters, time stamps, etc., and in case of occurrence of an error this most recently recorded information is linked to the error and stored, whereby the changes of state until the occurrence of the respective error can be simulated and visually displayed for an analysis on the basis of a virtual model of the physical robot.

Here it is advantageous that a visual simulation of the error(s) occurred can be made directly at the system by means of a virtual image, preferably on the output unit or one of the output units of the robot controller, i.e. that after the triggering of an error the maintenance staff accesses the robot controller, and thanks to the stored data the sequence up to the occurrence of the error can be reconstructed directly on the robot controller. Thus, the reason why the error was triggered can be determined with a very high probability directly on the system, and appropriate countermeasures be taken. It is therefore not necessary to transfer the data to a PC or laptop, so that the optimally fast and reliable error detection and correction are possible. It is thus also possible that, after the error(s) has or have been corrected and the system restarted, the virtual sequence of the error(s) can be replayed or repeated, respectively, on the robot controller during the working cycle of the system, in order to be able to analyze further details that could be useful for improving the system. Likewise, the data can also be downloaded from the robot controller to a laptop or computer or another robot controller or a superordinate network, in order to analyze them at leisure far away from the robot controller.

For those measures where the data storage is done directly in the robot controller and the visualization of the process is shown on the output unit of the robot controller with the help of a virtual robot model, it is advantageous that this creates automatically and in real time a linkage of the relevant data, and no further intervention by skilled staff is necessary. At the same time, the process can be visually inspected as often as desired, so that corresponding error analyses are possible. By the data storage on the robot controller, a smooth simulation of the process is also achieved, as no data need to be reloaded. The local storage on the robot controller also ensures that maintenance staff do not need any further tools to download data from a database of the system, but that the simulation can be done very easily on site. This ensures a maximally short downtime of the system until it can be used again.

Of course, it is also possible to download the data at a later time or even immediately, or to upload them to a superordinate network.

In an advantageous embodiment, the virtual robot model can make the movements of the robot run at any speed, in particular in slow motion. Thus, the creation process can be analyzed or viewed, respectively, in detail, for example by slowing down or even stopping the speed of the virtual robot model shortly before the error occurs in order to be able to view all details. Here, the maintenance staff can easily select different speeds by actuating defined buttons on the robot controller. It is also possible to mark/define corresponding points in time when the robot model is running, at which time the preset speed is automatically changed by the robot controller when the recording is replayed. This means that the maintenance staff do not need to focus on activation of the so-called slow-motion sequence, but can follow the details of the virtual process.

Advantageous embodiments are such in which respective changes of the operating states and the relevant data are stored for a defined freely adjustable period of time between 100 ms and one minute, preferably the injection cycle of the processing machine, before occurrence of an error. This ensures that optimal tracking is possible for the origin of the error. For the sake of completeness, it is mentioned that with an appropriate design of the robot controller with correspondingly large memory elements, a longer period of storage in the event of errors occurring is also possible.

Advantageous embodiments are such in which the data storage is done or performed, respectively, independently from the operating state of the robot. Thus, even during setting work, if the maintenance staff make an incorrect entry during the system setting, a storage can already be made so that an error is output when the system is commissioned and the cause of the error, in particular the incorrect setting, can be determined immediately via the robot controller. This ensures storage or recording, respectively, of the data regardless of the operating state of the machine, so that incorrect entries can be found as quickly as possible.

It is also possible, for example, to initiate a save process by activating a save button on the robot controller. This enables maintenance staff to observe a working cycle, for example, and on a new working cycle at a desired time to manually record or save, respectively, a storage of the previous and/or past working cycle over the preset period of time. This means that suspicious processes in the system, which could possibly lead to an error condition in the future, can be recorded and analyzed in advance.

However, advantageous are also those embodiments in which further states or changes of state of the robot, such as digital or analog inputs and outputs or their changes, respectively, are displayed in the virtual model. This ensures that the electrical signals corresponding to the mechanical positions of the machine or system can be checked or viewed, respectively, simultaneously. This means there is no need to constantly switch back and forth between the mechanical position of the system and the view of the associated electrical states in order to find the root cause of the error.

Advantageous embodiments are such in which the traversing parameters, equipment features and functionalities of the robot are stored in a configuration file which the robot accesses on the control side, wherein the robot controller creates a virtual robot model from this configuration file, which model is displayed directly on the robot controller for the validation and/or visualization of sequences of operations. This ensures that the virtual robot model with the mechanical structure of the processing device is represented as accurately as possible.

Furthermore, the invention is solved by a robot and/or robot controller, in which the robot controller is designed to record and store changes of state, positions, internal parameters, time stamps, etc., wherein in case of occurrence of an error it is designed to link and store the most recently recorded information with the error, whereby the changes of state up to the occurrence of the respective error can be simulated and visually displayed for an analysis on the basis of a virtual model of the physical robot. It is advantageous here that the downtime of the processing device and the entire system or work cell in the event of an error is significantly reduced, since analysis of the data can be performed directly on site at the machine by a virtual robot model on the robot controller. With such systems it is essential that in the event of a failure of a device, the downtime is kept as short as possible to avoid high failure costs.

The virtual viewing of the recorded work process often allows the cause of the error to be determined quickly and easily so that appropriate countermeasures or repairs, respectively, can be carried out.

For the sake of completeness, it is mentioned that the robot controller can record several errors with the associated data, in particular changes of state, positions, internal parameters, timestamps, etc. and this number of errors and linkages is limited only by the size of the memory of the robot controller.

Basically, it can be said that the solution according to the present invention ensures that in case of a failure of the system, the downtime can be kept as short as possible, since the visual sequence, preferably on the robot controller, enables the cause of the failure to be found quickly.

The invention is now explained in more detail by means of an exemplary embodiment shown in the drawings, wherein the invention is not limited to the illustration shown, in particular not to the structure and composition of the system.

Figure 2:
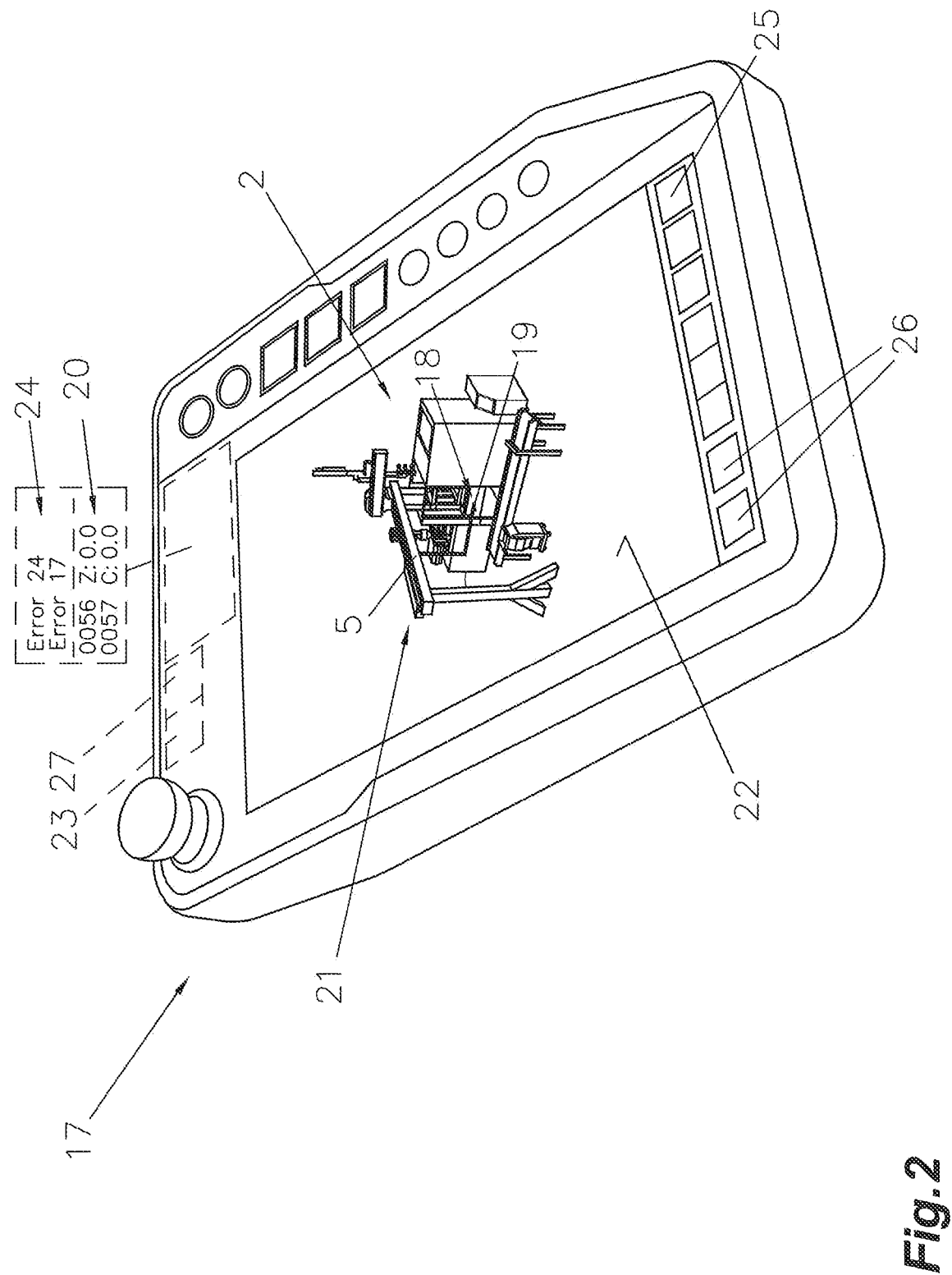
Figure 3:
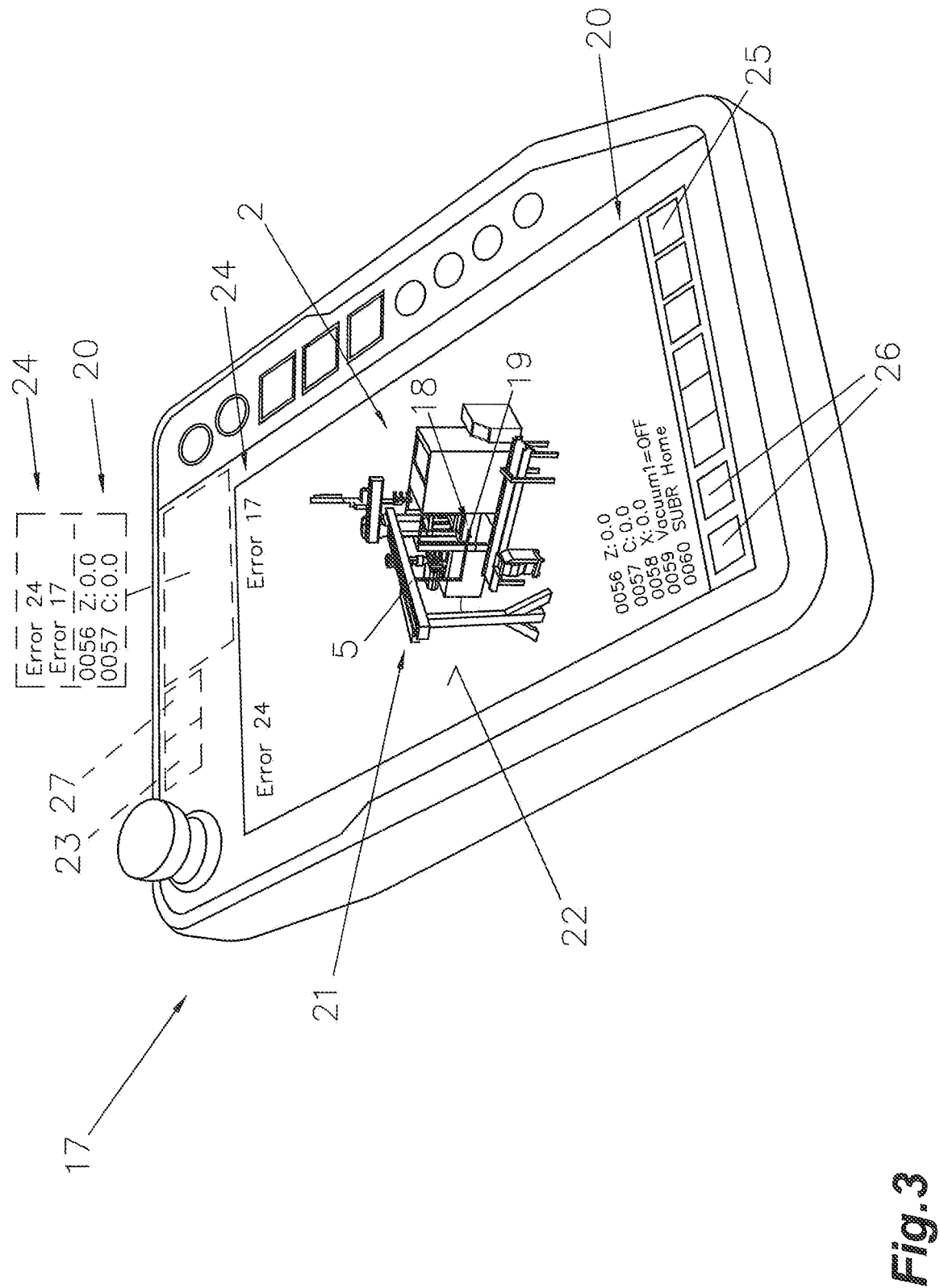
Figure 4:
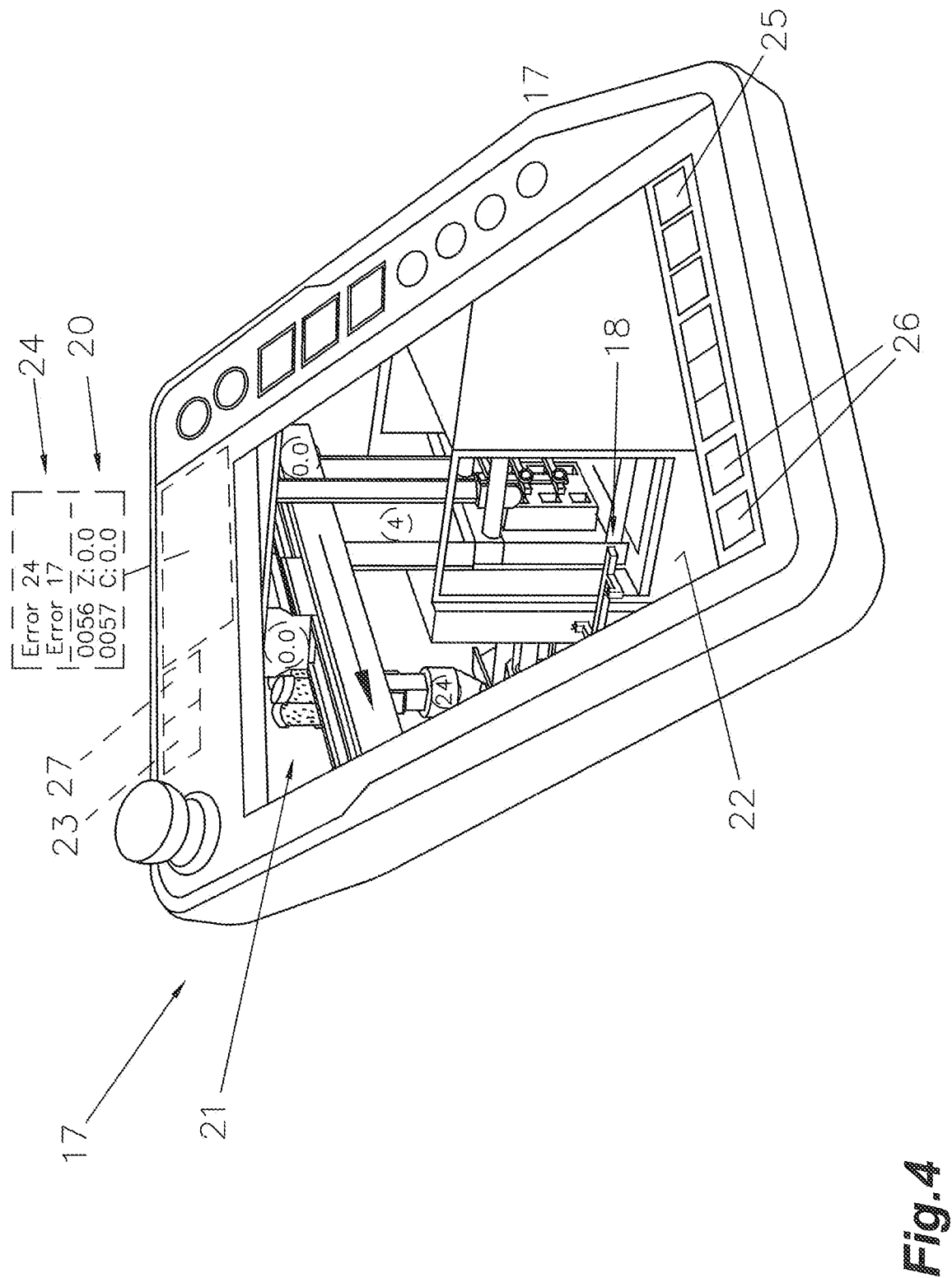

The Figures Show:

FIG. 1—an overview illustration of a plastics-processing industrial installation in a work cell, simplified, for illustrative purposes only;

FIG. 2—a schematic representation of a virtual robot model or twin on a robot controller, respectively, simplified, for illustrative purposes only;

FIG. 3—a schematic representation of the virtual robot model or twin on a robot controller, respectively, with a list of additional data, simplified, for illustrative purposes only;

FIG. 4—a schematic enlarged representation of the virtual robot model or twin on the robot controller, respectively, with data displayed at the individual components, in particular stored actual values from sensors, simplified, for illustrative purposes only.

It should be stated by way of introduction that, in the individual embodiments, the same parts are provided with the same reference numbers or same component designations, wherein the disclosures contained in the entire description can, by analogy, be transferred to identical parts with identical reference numbers or identical component designations, respectively. The position details selected in the description, such as, e.g., top, bottom, lateral, etc., likewise relate to the figure described, and in the event of a change of position, they are to be transferred to the new position by analogy. Individual features or feature combinations from the exemplary embodiments shown and described may also represent independent inventive solutions.

FIG. 1 shows an industrial installation 1, in particular a work cell 2 for injection molding applications, in which the individual components/devices for producing one or several products/semi-finished products or injection molded parts 3 are interconnected in work cell 2. Preferably, an injection molding machine 4 is used as the processing machine, to which a robot 5 or handling robot, respectively, for removing the produced injection molded part 3 is assigned. Here, the injection molded part 3 is removed from an opening injection mold 7 by a removal device 6, in particular equipped with a gripper with gripping tongs and/or suction nozzles, and deposited on a device, in particular a conveyor belt 8.

For example, it is possible that for the production of an injection molded part 3 plastic granules 9 are fed to the processing machine 4 via a granulate conveyor 10 and possibly via a metering device 11 or from a supply store. By means of a temperature control unit 13 and/or cooling unit, the injection mold 7 can be kept at operating temperature by feeding a temperature control medium or heated or cooled accordingly, respectively, so that optimum processing of the plastic granules 9, which must be plasticized for injection into the injection mold 7, is made possible.

In addition, the system can be equipped with a monitoring device 15, in particular a camera system, in order to be able to carry out an automatic quality control of the manufactured product 3. Very often there are also upstream or downstream automation systems 18, e.g. sprue cut-off 19, centering, separating, feeding, crate and pallet stacking stations, etc., which are directly integrated into the robot controller or industrial installation 1, respectively, and controlled by it via digital or analog signals or other communication interfaces. The creation of the sequence and control logic for the robot 5 or handling robot 5, respectively, and any connected automation components 18 or systems is typically carried out in a teach-in procedure. Likewise, the programming of the sequence and control logic can first be done offline on a PC. The system-specific values, e.g. the actual positions of the axes, are then added in turn in the teach-in procedure.

In order for the individual devices to be adjusted or programmed, respectively, they are preferably equipped with corresponding control electronics, wherein the setting or programming, respectively, is entered and displayed via displays 16 or a robot controller 17 arranged on the devices. A connection can be established with the individual components, preferably wirelessly, via the robot controller 17, so that a correspondingly stored surface for this device is invoked. Of course, it is also possible to program or adjust, respectively, the units via an external component connected to the units via an interface.

For the sake of completeness, it is also mentioned that all devices are connected to corresponding lines, in particular power supply, network and connection lines, liquid supply lines, material lines, etc., which in the interest of clarity were not displayed in the representation shown.

According to FIGS. 1 to 4, a method for the continuous storage of internal data 20 of the robot 5 or of any connected automation components 18 or systems 6, 8, 15, 19, respectively, in the robot controller 17, in particular operating states for the visualization of past sequences of operation and logic for this purpose, according to the present invention is shown.

The robot controller 17 is designed to reproduce a virtual twin or robot model 21, respectively, in particular a virtual representation of the system or work cell 2, respectively, at the output point, in particular a touch screen 22, wherein all connected automation components 18 or systems 6, 8, 15, 19, respectively, of work cell 2 or industrial installation 1, respectively, are automatically read in via configuration files 27 or manually inserted into the model and displayed.

The data 20 important for error analysis and virtual representation of operating states are read in directly by the robot controller 17 and stored in the log file 23. The robot controller 17 creates a virtual robot model 21 from the configuration file 27 and the corresponding sequences of operations and operating states of the virtual robot model 21 from a log file 23, which are displayed directly on the robot controller 17 for validation or visualization. Here, the virtual twin or the virtual robot model, respectively, 21 shown on the display 22 can be enlarged or reduced at will, and its viewing position can be changed, for which purpose the display is preferably designed as touch display 22. Thus, a user, in particular a maintenance staff, can operate and adjust the virtual robot model 21 in a simple way via the robot controller 17.

In systems or work cells, respectively, 2 that operate automatically in this way, it is possible that a wide variety of errors 24 may occur during operation, for example due to faulty signal transmission in the communication between machine 4 and robot 5, time delays in the execution of functions, non-constant injection parameters that cause, for example, molded items 3 to be removed to become stuck, or worn components in the mechanical interfaces between injection molded article 3 and the automation components 18 or systems 6, 8, 15, 19, etc., so that the system is automatically stopped, wherein usually upon occurrence of an error condition an error message or error 24, respectively, in particular one or more error notifications, are issued. The maintenance staff or trained personnel can often look up in a corresponding error list 24 which error 24 it is and what the cause is. However, in many cases this is not helpful, since an error 24 can often have a variety of causes, or it can be caused only by a certain combination of states of robot 5 and/or injection molding machine 4 and/or automation components 6, 8, 15, 18, which must be determined by the maintenance staff themselves in order to ensure continued error-free operation. Here, it is very important that the downtime or failure time, respectively, of the entire work cell 2 be kept as short as possible in order to keep the loss of production and the lost production capacity as small as possible.

According to the present invention, the robot controller 17 records data 20, in particular state changes, positions, internal parameters, time stamps, etc., in the log file 23 and, in case of the occurrence of an error 24, links the data 20 with the error 24, in particular the error messages, whereby the changes of state up to the occurrence of the respective error 24 are simulated and visually displayed for an analysis based on the virtual model 21 of the physical robot 5. This means that during the functioning production process of work line 2, one device, preferably the robot controller 17, constantly stores specially defined data 20 or all available data 20 for a short time, in particular over a defined period of time. If an error 24 suddenly occurs in the system, the recently stored and relevant data 20 are linked to error 24, wherein preferably an error message is simultaneously output. If the error 24 is serious, the entire system, in particular the work cell 2, is stopped.

In order to determine the cause of the error as quickly as possible, it is now possible to run a simulation on the robot controller 17 with the stored data 20, i.e., a so-called virtual twin or robot model, respectively, 21 is invoked on the robot controller 17, which accesses the stored data 20 in the log file 23 with the error code 24 and loads it for simulation. This allows the maintenance staff to observe by means of the virtual process how the error 24 occurred, and to take countermeasures accordingly quickly so that the system is ready for operation again.

It turned out to be very helpful that in addition to the virtual sequence further data 20, in particular the currently running sequence and control sequences with the associated actual states, as shown in FIGS. 3 and 4, are displayed. This makes it easy to compare the mechanical position with the electrical and numerical actual values of encoders and sensors. For the sake of completeness, it is pointed out that it is possible to switch between the virtual robot model 21 and the actual robot 5 at any time on the robot controller 17.

In order to enable exact error detection, it is also possible that the virtual robot model 21, in particular the virtual twin 21, can execute the movements of the robot 5 at any speed, especially in slow motion. Here preferably the speed is reduced in order to be able to observe the exact motion sequence on the robot model 21. It is possible that in turn one or more speed buttons 26, as shown schematically in FIG. 4, are present in order to allow fast and easy reduction of the playback speed of robot model 21. Thus, the observer can reliably detect the most minute changes in the virtual robot model 21 or even short-term changes of inputs and outputs, sensor or encoder values, etc.

It is also possible that any states of data 20 of the inputs and outputs, sensors or encoders, can be selected by the user and displayed during the process. This is advantageous if the cause of the error 24 was supposedly not found after a run, so that further or other data 20 are displayed for a repeated run, in order to detect any occurring irregularities in the actual values. For this purpose, it is possible that a sub-menu can be invoked from the robot controller 17, from which data 20 can be selected.

In order to enable quick access to the stored data 20, the data 20 are stored directly in the robot controller 17. Of course, it is also possible to store the data 20 on an external storage medium, e.g. PC or laptop, in order to ensure long-term storage.

For the sake of completeness, it is mentioned that in the case of recorded data 20 these are preferably recorded over a defined period of time in order to limit the amount of data accordingly. It is also essential that the data are automatically time-stamped so that always the values occurring at the respective points in time are displayed and shown during the simulation. For this purpose, maintenance staff or skilled staff can freely set the duration for the recording points, i.e. the time between two storages, wherein with smaller time intervals higher accuracy of the representation is achieved, but a larger amount of data must be stored.

It is also possible that the data storage takes place or is carried out, respectively, independently of the operating states of the robot 5, i.e. that, for example, a manual triggering of the data storage can be initiated by a maintenance staff, whereupon a data recording is carried out over the defined period of time even without error 24. It is also possible that the manually started data recording is ended again only by a manual stop, so that the maintenance staff records the data for as long as it is necessary for you.

It is pointed out that the invention is not limited to the embodiments shown, but may comprise further embodiments.

The invention claimed is:

1. A method for the continuous storage of internal operating states and for the visualization of past sequences for a robot wherein the robot comprises a robot controller and is at least one of mounted on or next to an injection molding machine, the method comprising:
via the robot, removal, handling, manipulating or further processing of injection molded parts which have just been produced; and
via the robot controller:
storing data comprising at least changes in state of at least one of the robot, the injection molding machine or connected automation components, and
in an event of an occurrence of an error, linking most recently recorded information prior to the error and storing it,
wherein the changes in state up to the occurrence of the error are simulated on a virtual model of the robot for analysis and visually displayed on an output unit of the robot controller,
wherein the data is stored directly on the robot controller, and
wherein the virtual robot model is able to run movements of the robot at various speeds.

2. The method according to claim 1, wherein respective changes in the operating states and relevant data are stored for a period of time between 100 ms and one minute before the occurrence of the error.

3. The method according to claim 2, wherein the period is the injection cycle of the processing machine before the occurrence of an error.

4. The method according to claim 1, wherein the data storage takes place or is carried out, respectively, independently of an operating state of the robot.

5. The method according to claim 1, wherein further states or changes in state of the robot, comprising digital or analog inputs and outputs or their changes, respectively, are overlaid onto the virtual model.

6. The method according to claim 1, further comprising storing traversing parameters, equipment features and functionalities of the robot in a configuration file that the robot accesses on a control side,
wherein the robot controller creates the virtual robot model from the configuration file, which is displayed directly on the robot controller for at least one of the validation or visualization of sequences of operations.

7. A robot system configured to perform the method according to claim 1, the robot system comprising:
a robot, which is mounted on or next to the injection molding machine, is designed for removal, handling, manipulation or further processing of the injection molded parts which have just been produced,
a robot controller, which is configured for the recording and storage of data including at least changes in state in the event of an occurrence of an error, and is configured to link and store the most recently recorded information with the error, and
wherein the robot controller is configured to simulate on a virtual model of the robot for analysis the changes in state up to the occurrence of the respective error and visually displayed on an output of the robot controller,
wherein the data is stored directly on the robot controller, and
wherein the virtual robot model is able to run movements of the robot at various speeds.

8. The method according to claim 1, wherein the robot controller further stores data comprising changes in at least one of positions of the components, internal parameters or time stamps of the at least one of the robot, the injection molding machine or the connected automation components.

9. The method according to claim 1, wherein the virtual robot model executes the movements of the robot in slow motion.

10. A robot system comprising:
a robot controller for the continuous storage of internal operating states and visualization of past sequences of operations,
a robot mounted on or next to an injection molding machine, the robot being designed for removal, handling, manipulation or further processing of injection molded parts which have just been produced; and
a data recording and storage system for recording and storing at least changes in state of at least one of the robot, the injection molding machine or connected automation components,
wherein, in an event of an occurrence of an error, most recently recorded data with the error is linked and stored, whereby changes in state up to the occurrence of the error are simulated on a virtual model of the robot for analysis and visually displayed on an output unit of the robot controller,
wherein the data is stored directly on the robot controller, and
wherein the virtual robot model is able to run movements of the robot at various speeds.

11. The method according to claim 10, wherein the data recording and storage system is further configured for recording and storing data comprising changes in at least one of positions of the components, internal parameters, or time stamps of the at least one of the robot, the injection molding machine or the connected automation components.

12. The method according to claim 10, wherein the various speeds at which the virtual robot model is able to run movements includes slow motion.

* * * * *